United States Patent
Ko et al.

(10) Patent No.: US 11,419,277 B2
(45) Date of Patent: Aug. 23, 2022

(54) PLANT CULTIVATION METHOD AND LIGHT TREATMENT UNIT FOR INCREASING OF THE CONTENT OF PHYTOCHEMICAL

(71) Applicant: SEOUL VIOSYS CO., LTD., Gyeonggi-do (KR)

(72) Inventors: Sang Min Ko, Gyeonggi-do (KR); Se Ryung Kim, Gyeonggi-do (KR); Jin Won Kim, Gyeonggi-do (KR)

(73) Assignee: SEOUL VIOSYS CO., LTD., Gyeonggi-Do (KR)

( * ) Notice: Subject to any disclaimer, the term of this patent is extended or adjusted under 35 U.S.C. 154(b) by 325 days.

(21) Appl. No.: 16/660,510

(22) Filed: Oct. 22, 2019

(65) Prior Publication Data

US 2020/0120878 A1 Apr. 23, 2020

Related U.S. Application Data (60) Provisional application No. 62/749,386, filed on Oct. 23, 2018.

(51) Int. Cl.
*A01G 7/04* (2006.01)
*A01C 1/02* (2006.01)
*A01G 22/35* (2018.01)

(52) U.S. Cl.
CPC ............ *A01G 7/045* (2013.01); *A01C 1/02* (2013.01); *A01G 22/35* (2018.02)

(58) Field of Classification Search
CPC ............ A01G 7/045; A01G 7/04; A01G 7/00
See application file for complete search history.

(56) References Cited

U.S. PATENT DOCUMENTS

| | | | | |
|---|---|---|---|---|
| 2015/0223402 | A1* | 8/2015 | Krijn | A01G 7/045 47/58.1 LS |
| 2016/0073599 | A1* | 3/2016 | Wargent | A01G 7/00 800/276 |
| 2017/0000041 | A1* | 1/2017 | Wargent | A01G 7/045 |
| 2017/0265375 | A1* | 9/2017 | Ide | A01G 17/02 |
| 2018/0206422 | A1* | 7/2018 | Vandecruys | A01G 31/042 |
| 2020/0060098 | A1* | 2/2020 | Kim | A01G 9/20 |
| 2021/0161079 | A1* | 6/2021 | Ko | A01G 22/40 |
| 2021/0289710 | A1* | 9/2021 | Kim | A01G 7/045 |

FOREIGN PATENT DOCUMENTS

| | | |
|---|---|---|
| JP | 2005143377 | 6/2005 |
| KR | 1020040086962 | 10/2004 |
| KR | 1020050089492 | 9/2005 |
| KR | 1020120016383 | 2/2012 |
| KR | 1020150035817 | 4/2015 |

OTHER PUBLICATIONS

International Search Report for International Application PCT/KR2019/013943, dated Feb. 7, 2020.

* cited by examiner

*Primary Examiner* — Kristen C Hayes
(74) *Attorney, Agent, or Firm* — Burris Law, PLLC

(57) ABSTRACT

A plant cultivation method and light treatment unit for increasing the content of a phytochemical. The plant cultivation method includes: growing a plant by germinating a seed; increasing the content of resveratrol, which is a phytochemical, through UV treatment on the plant; and harvesting the plant. Here, UV treatment is performed by irradiating the plant with UV light emitted from an LED.

17 Claims, 8 Drawing Sheets

PLANT CULTIVATION METHOD AND LIGHT TREATMENT UNIT FOR INCREASING OF THE CONTENT OF PHYTOCHEMICAL

CROSS-REFERENCE TO RELATED APPLICATION

This application claims priority from and the benefit of United States Provisional Patent Application No. 62/749,386, filed on Oct. 23, 2018, which is hereby incorporated by reference for all purposes as if fully set forth herein.

BACKGROUND FIELD

The present disclosure relates to a plant cultivation method and light treatment unit for increasing the content of a phytochemical.

DISCUSSION OF THE BACKGROUND

Plants produce organic matter from carbon dioxide and water using light energy through photosynthesis. Plants use chemical energy of organic matter obtained through photosynthesis as nutrients for their growth. Plants contain phytochemicals that have beneficial effects on a subject in need thereof.

Phytochemicals of plants have various efficacies, such as antioxidant, anticancer, and anti-inflammatory effects, and are used to treat various diseases and symptoms.

Recently, various methods have been tried to increase the phytochemical content of plants.

SUMMARY

Embodiments of the present disclosure provide a plant cultivation method and light treatment unit for increasing the content of a phytochemical.

Embodiments of the present disclosure provide a plant cultivation method and light treatment unit which can increase phytochemical content without reduction in growth of a plant.

In accordance with one embodiment of the present disclosure, there is provided a plant cultivation method for increasing the content of a phytochemical, including: growing a plant by germinating a seed of the plant; increasing the content of resveratrol, which is a phytochemical, through UV treatment on the plant; and harvesting the plant. In increasing the phytochemical content, UV treatment is performed by irradiating the plant with UV light emitted from an LED.

In accordance with another embodiment of the present disclosure, there is provided a light treatment unit for increasing the content of resveratrol, which is a phytochemical, through irradiation of a plant under cultivation with at least one type of UV light selected from the group of UVB and UVC before harvesting.

According to embodiments of the present disclosure, the phytochemical content of a plant can be increased through UV treatment of the plant.

In addition, according to embodiments of the present disclosure, the phytochemical content of a plant can be increased without reduction in growth of the plant through UV treatment of the plant immediately before harvesting.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF EMBODIMENTS

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as control boards and control units. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In accordance with one aspect of the present disclosure, a plant cultivation method includes growing a plant by germinating a seed, subjecting the plant to UV treatment; and harvesting the plant.

In an embodiment of the present disclosure, peanut sprouts having an increased content of resveratrol, which is a phytochemical, are cultivated from peanut seeds.

First, the peanut seeds are soaked in water for a certain period of time. By way of example only, the peanut seeds are soaked in water for 0.5 to 6 hours.

The soaked peanut seeds are cultivated under dark conditions for a total of 7 days. During this period, the peanut seeds germinate and peanut sprouts appear and grow. Here, cultivation temperature is maintained at 20° C. to 25° C. and the peanut seeds and the peanut sprouts are supplied with water every 20 minute.

The peanut sprouts are subjected to UV treatment for 24 hours after 6 days subsequent to sowing. Here, the peanut sprouts are irradiated with UVC, or UVB at an irradiance of 10 $\mu$W/cm$^2$ for 24 hours. Through the UV treatment, content of resveratrol, which is a phytochemical, of the peanut sprouts may increase.

UV light is known to deteriorate the growth of plants. Thus, treating peanut seeds with UV light can cause poor germination and thus poor growth. In addition, even after germination of peanut seeds, if peanut sprouts are subjected to UV treatment when too young, the peanut sprouts can exhibit poor growth. Therefore, a time period for UV treatment, duration for UV treatment, and the intensity of radiation for UV treatment need to be determined considering growth of the peanut sprouts and increase in phytochemicals. In consideration of these factors, in the present disclosure, UV treatment is performed at an irradiance of 10 $\mu$W/cm$^2$ for 24 hours immediately before harvesting.

That is, before harvesting, the peanut sprouts are subjected to UV treatment for 24 hours to have an increased resveratrol content.

Figure 1:
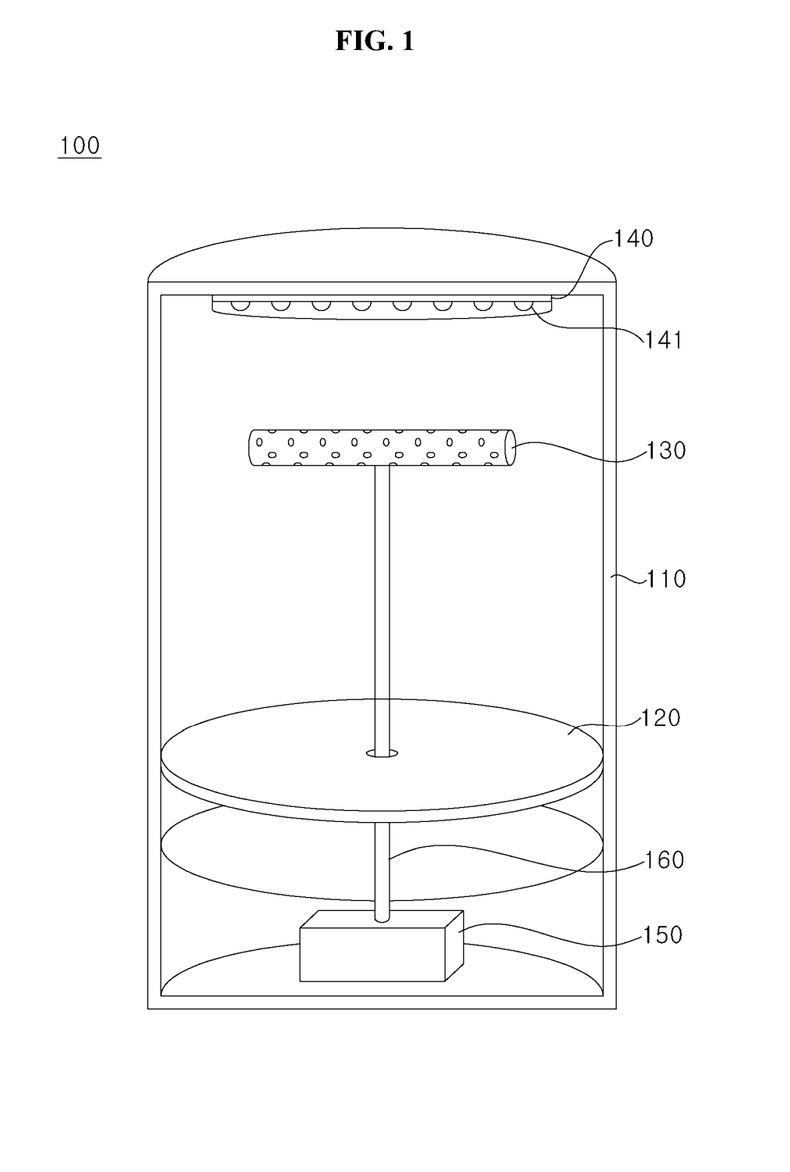
FIG. 1 is an exemplary view of a plant cultivation device according to the present disclosure.

For example, both cultivation and UV treatment of the peanut sprouts may be carried out in a plant cultivation device 100 of FIG. 1.

FIG. 1 is a sectional view of an exemplary plant cultivation device 100 according to the present disclosure.

Referring to FIG. 1, the plant cultivation device 100 includes a housing 110, a cultivation plate 120, a water supply unit 130, a light treatment unit 140, a pump 150, and a pipe 160.

The housing 110 provides a space for cultivation of peanut sprouts. The cultivation plate 120, the water supply unit 130, the light treatment unit 140, the pump 150, and the pipe 160, provided for cultivation of the peanut sprouts, are disposed in an internal space of the housing 110.

In addition, the housing 110 blocks external light. That is, the housing 110 is formed of a material non-permeable to light to prevent external light from entering the internal space. Further, the housing 110 prevents UV light emitted from the light treatment unit 140 from leaking out of the housing 110. With the housing 110, the peanut sprouts can be cultivated under dark conditions.

Peanut seeds are sown on the cultivation plate 120 to grow into peanut sprouts. The cultivation plate 120 is upwardly spaced apart from an inner lower surface of the housing 110. Water is stored in a space between the cultivation plate 120 and the inner lower surface of the housing 110. Here, the cultivation plate 120 is also spaced apart from the water stored in the housing 110.

The water supply unit 130 discharges water to the cultivation plate 120 to supply water to the peanut seeds and the peanut sprouts on the cultivation plate 120. As shown in FIG. 1, the water supply unit 130 may have an elongated structure formed with a plurality of outlets through which water is discharged. For example, the water supply unit 130 may be a sprinkler. The water supply unit 130 may be connected to a controller controlling water supply time. Thus, the water supply unit 130 can supply the peanut sprouts with a predetermined amount of water at a predetermined time. For example, the water supply unit 130 may supply water to the peanut sprouts at an interval of 20 minutes.

The water supply unit 130 may be secured at an upper portion of the housing 110 to be rotatable horizontally. Upon rotation, the water supply unit 130 can supply water more evenly throughout the cultivation plate 120.

The pump 150 is disposed under the cultivation plate 120. The pump 150 and the water supply unit 130 are connected to one another via the pipe 160. The pump 150 moves water stored below the cultivation plate 120 to the water supply unit 130.

The light treatment unit 140 serves to increase the content of resveratrol, which is a phytochemical.

The light treatment unit 140 emits UV light toward the peanut sprouts on the cultivation plate 120. For example, the light treatment unit 140 may be disposed above the cultivation plate 120.

The UV light emitted from the light treatment unit 140 may be at least one selected from the group of UVB and UVC. The light treatment unit 140 includes at least one UV LED 141. For example, the light treatment unit 140 may include a UVB LED, or a UVC LED. Alternatively, the light treatment unit 140 may include both a UVB LED and a UVC LED. Here, the UVB may be UV light having a wavelength of 295 nm. In addition, the UVC may be UV light having a wavelength of 275 nm.

The LED 141 of the light treatment unit 140 may include a light emitting structure and a plurality of electrodes.

The light emitting structure includes a first semiconductor layer, a second semiconductor layer, and an active layer formed between the first semiconductor layer and the second semiconductor layer.

The first semiconductor layer may be a nitride-based semiconductor layer doped with a first conductive dopant. The nitride-based semiconductor layer may be formed of, for example, GaN, AlN, AlGaN, InGaN, InN, InAlGaN, or AlInN. In addition, the first conductive dopant is a p-type dopant, and may include Mg, Zn, Ca, Sr, Ba, and the like.

The second semiconductor layer may be a nitride-based semiconductor layer doped with a second conductive dopant. The second conductive dopant is an n-type dopant, and may include, for example, Si, Ge, Se, Te, O, C, and the like.

The active layer is a layer in which electrons (or holes) injected from the first semiconductor layer meet holes (or electrons) injected from the second semiconductor layer to emit light due to a band gap difference between energy bands of the active layer. The active layer may be formed of, for example, at least one selected from among compound semiconductors of Groups III-V or II-VI.

The plurality of electrodes is connected to the first semiconductor layer and the second semiconductor layer, respectively. For example, the plurality of electrodes may include a first electrode connected to the first semiconductor layer and a second electrode connected to the second semiconductor layer. For example, the electrodes may be formed of various metals such as Al, Ti, Cr, Ni, Au, Ag, Ti, Sn, Ni, Cr, W, and Cu, or alloys thereof. In addition, the electrodes may have a monolayer structure, or a multilayer structure.

The electrodes may be connected in various forms at various locations to the first semiconductor layer and the second semiconductor layer, respectively.

In this embodiment, the light treatment unit uses the LED 141 as a light source, rather than a general lamp.

Typical lamps emit light having a wide spectrum. Thus, it is difficult to separate light in some specific wavelength bands from light emitted from the typical lamps. That is, the lamps may have difficulty in selectively supplying light having a specific wavelength to a sample (plant).

On the contrary, LEDs emit light that has a sharp peak at a certain wavelength and has a narrower half-width than light from typical lamps. Therefore, LEDs can easily supply light in a specific wavelength band to a sample.

In addition, typical lamps have difficulty in supplying a specific limited amount of light to a sample. Accordingly, long light irradiation time is required to supply a sufficient amount of light to a sample using the typical lamps.

On the contrary, LEDs can supply a specific limited amount of light to a sample. Therefore, use of the LEDs allows accurate calculation of light irradiation time required to supply a sufficient amount of light to a sample. That is, use of the LEDs allows light in a specific wavelength region to be supplied to a sample in a specific amount for a specific period of time.

Further, the typical lamps may take a long time to reach a maximum irradiance thereof after being powered on.

On the contrary, the LEDs can reach almost a maximum irradiance thereof substantially immediately after being powered on. Therefore, the LEDs allow precise control over light irradiation time upon supplying a sample with light having a specific wavelength.

The light treatment unit 140 may be connected to a controller that can control UV fluence, UV emission time, UV wavelength, and the like. For example, the light treatment unit 140 may irradiate the peanut sprouts with UV light at an irradiance of 10 μW/cm$^2$ for 24 hours after 6 days subsequent to sowing.

In addition, although not shown in FIG. 1, the plant cultivation device 100 may further include a temperature controller. The temperature controller serves to maintain the internal space of the plant cultivation device 100 at a predetermined constant temperature. Thus, the plant cultivation device 100 can allow the peanut sprouts to grow at the constant temperature. For example, the temperature control device may maintain the internal space of the plant cultivation device 100 at a temperature of 20° C. to 25° C.

FIG. 2 to FIG. 5 are experimental results of phytochemical content of a plant cultivated according to the embodiments of the present disclosure.

Peanut seeds soaked in water for 0.5 to 6 hours were sown in the plant cultivation device (100 of FIG. 1) and cultivated for a total of 7 days. During this period, the peanut seeds germinated, and peanut sprouts appeared and grew. Here, with the plant cultivation device (100 of FIG. 1) maintained at a temperature of 20° C. to 25° C., water was supplied to the peanut sprouts at an interval of 20 minutes.

The peanut sprouts were subjected to UV treatment at an irradiance of 10 μW/cm$^2$ for 24 hours after 6 days after sowing. Thereafter, the peanut sprouts were harvested, followed by measurement of a total phenolic content, antioxidant capacity, and resveratrol content of the peanut sprouts. In addition, the dry weight of the peanut sprouts was measured.

A control group was a peanut sprout sample not subjected to UV treatment. That is, the control group was peanut sprouts cultivated in the plant cultivation device (100 of FIG. 1) for a total of 7 days without UV treatment.

Experimental group 1 was a peanut sprout sample subjected to UVB treatment and Experimental group 2 was a peanut sprout sample subjected to UVC treatment. Here, UVB was UV light having a wavelength of 295 nm and UVC was UV light having a wavelength of 275 nm.

Figure 2:
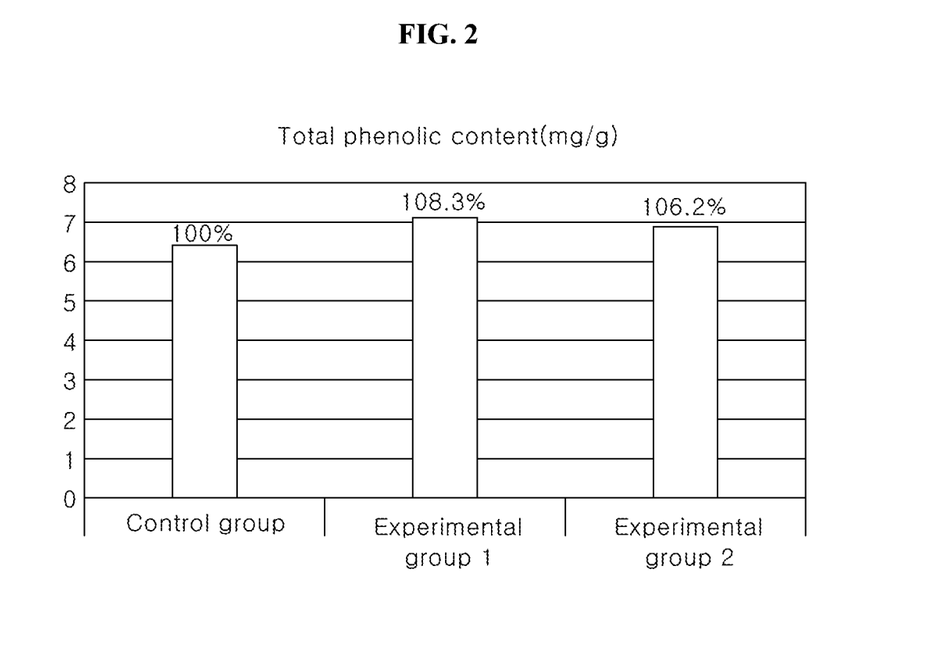
FIG. 2 is a graph showing a total phenolic content of a plant cultivated according to one embodiment of the present disclosure.

FIG. 2 is a graph showing a total phenolic content of peanut sprouts, as a plant cultivated according to the embodiments of the present disclosure.

Referring to FIG. 2, Experimental group 1 had a total phenolic content of 108.3% and Experimental group 2 had a total phenolic content of 106.2% when total phenolic content of the control group was assumed to be 100%. That is, the total phenolic content of the peanut sprouts subjected to UV treatment for 24 hours before harvesting was similar to that of the peanut sprouts not subjected to UV treatment.

Figure 3:
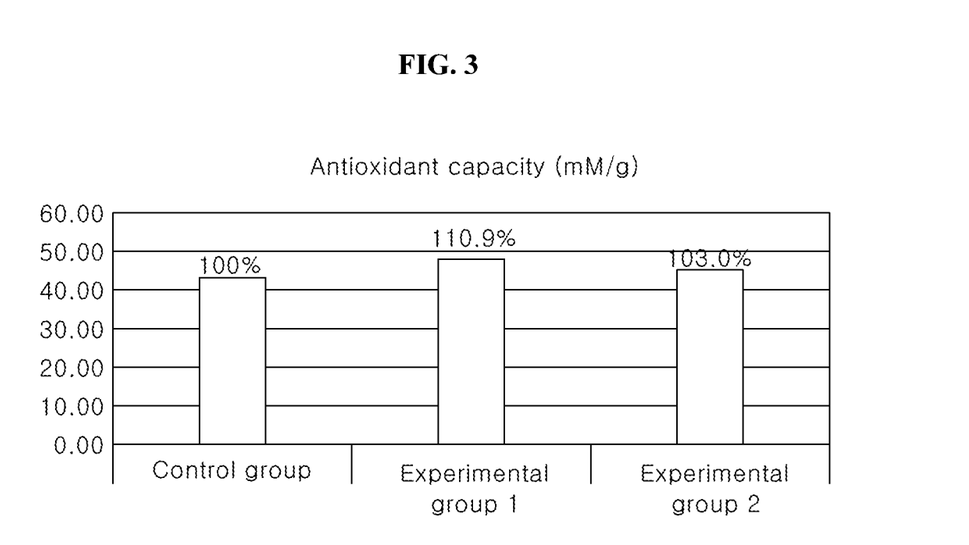
FIG. 3 is a graph showing antioxidant capacity of a plant cultivated according to the embodiment of the present disclosure.

FIG. 3 is a graph showing antioxidant capacity of peanut sprouts, as a plant cultivated according to the embodiments of the present disclosure.

Referring to FIG. 3, Experimental group 1 had an antioxidant capacity of 110.9% and Experimental group 2 had an antioxidant capacity of 103.0% when antioxidant capacity of the control group was set to be 100%. That is, the antioxidant capacity of the peanut sprouts subjected to UV treatment for 24 hours before harvesting was similar to that of the peanut sprouts not subjected to UV treatment.

Figure 4:
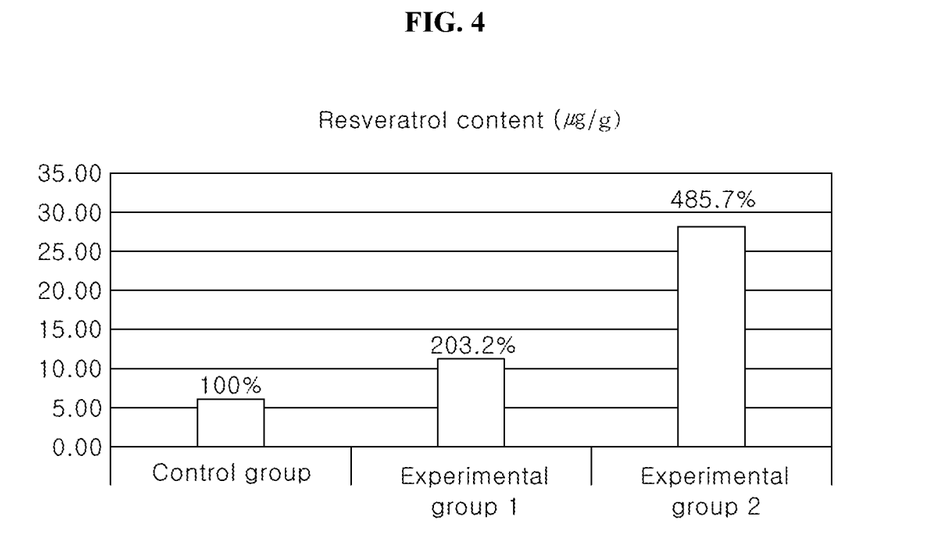
FIG. 4 is a graph showing a resveratrol content of a plant cultivated according to the embodiment of the present disclosure.

FIG. 4 is a graph showing a resveratrol content of peanut sprouts, as a plant cultivated according to the embodiments of the present disclosure.

Referring to FIG. 4, Experimental group 1 had a resveratrol content of 203.2% and Experimental group 2 had a resveratrol content of 485.7% when resveratrol content of the control group was set to be 100%.

That is, it can be seen that the resveratrol content of the peanut sprouts subjected to UVB treatment for 24 hours before harvesting was twice or more as high as that of the peanut sprouts not subjected to UV treatment.

In addition, it can be seen that the resveratrol content of the peanut sprouts subjected to UVC treatment for 24 hours before harvesting was four times or more as high as that of the peanut sprouts not subjected to UV treatment.

Referring to FIG. 2 to FIG. 4, Experimental groups 1 and 2 had a similar total phenolic content and antioxidant capacity to the control group and had a considerably increased resveratrol content, as compared with the control group.

Therefore, it could be seen that the UV treatment before harvesting could increase the resveratrol content of the peanut sprouts without making a change in total content of phytochemicals. In other words, it could be seen that the UV treatment before harvesting may have had a more significant effect on increase in the content of resveratrol than on increase in the content of the other phytochemicals.

Figure 5:
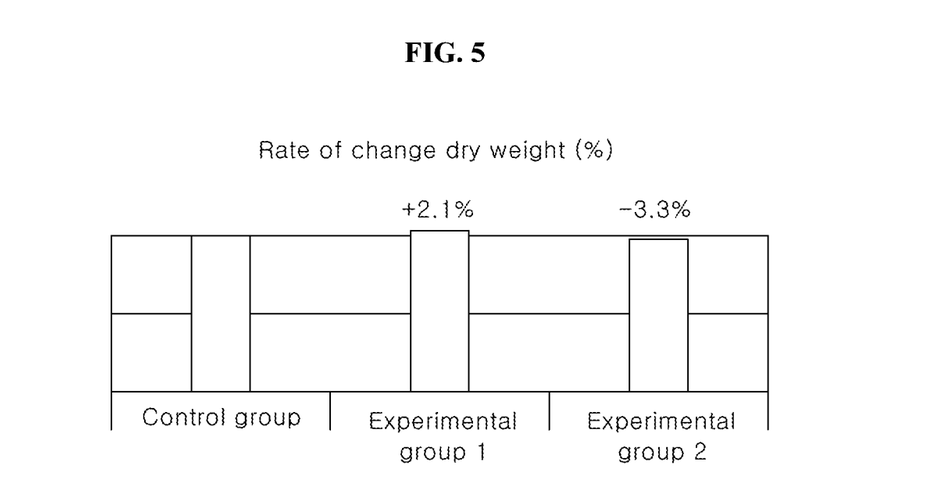
FIG. 5 is a graph showing a dry weight of a plant cultivated according to the embodiment of the present disclosure.

FIG. 5 is a graph showing a dry weight of peanut sprouts, as a plant is cultivated according to the embodiments of the present disclosure.

The harvested peanut sprouts have been frozen with liquid nitrogen to stop biological activity and have been dried, followed by measurement of the weight of the dried peanut sprouts. Freezing and drying of the peanut sprouts have been performed using a freeze dryer.

Referring to FIG. 5, the dry weight of Experimental group 1 is increased by 2.1%, as compared with that of the control group. In addition, the dry weight of Experimental group 2 is decreased by 3.3%, as compared with that of the control group. That is, Experimental groups 1 and 2 have similar dry weights to the control group. Therefore, it can be seen that the UV treatment before harvesting did not affect growth of the peanut sprouts.

Referring to the experimental results of FIG. 4 and FIG. 5, it can be seen that the UVB or UVC treatment for 24 hours before harvesting increases resveratrol content of peanut sprouts twice or more without reduction in the growth of the peanut sprouts.

In conclusion, through the experiments of FIG. 2 to FIG. 5, it is confirmed that the UV treatment of a plant for 24 hours before harvesting can increase the content of resveratrol, which is a phytochemical, without reduction in the growth of the plant.

Figure 6:
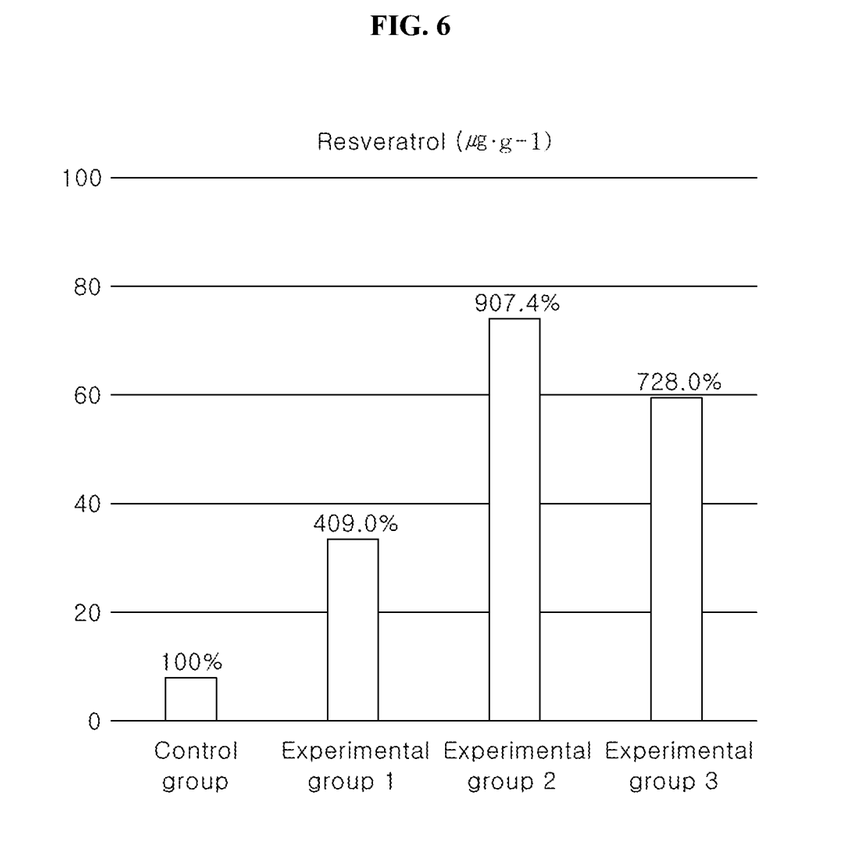
FIG. 6 is a graph showing a UV wavelength-dependent phytochemical content of peanut sprouts.

FIG. 6 is a graph showing a UV wavelength-dependent phytochemical content of peanut sprouts.

Peanut seeds soaked in water for 0.5 to 6 hours were sown in the plant cultivation device (100 of FIG. 1) and cultivated. During cultivation, the peanut seeds germinated and peanut sprouts appeared and grew. Here, with the plant cultivation device (100 of FIG. 1) maintained at a temperature of 26±2° C., water was supplied to the peanut sprouts at intervals of 20 minutes.

The peanut sprouts were subjected to UV treatment at an irradiance of 10 µW/cm$^2$ for 24 hours after 6 days subsequent to sowing. Thereafter, the peanut sprouts were harvested, followed by measurement of the content of resveratrol, which is a phytochemical, and then the measured value was compared with that of a control group. To improve experimental accuracy, the content of resveratrol was measured after removing seed coats from the peanut sprouts.

In this experiment, the control group was a peanut sprout sample not subjected to the UV treatment. Experimental group 1 was a peanut sprout sample subjected to the UV treatment at a wavelength of 295 nm. Experimental group 2 was a peanut sprout sample subjected to the UV treatment at a wavelength of 285 nm. Experimental group 3 was a peanut sprout sample subjected to the UV treatment at a wavelength of 275 nm.

FIG. 6 is a graph showing a UV wavelength-dependent phytochemical content of peanut sprouts.

Referring to FIG. 6, Experimental groups 1 to 3, which had been subjected to the UV treatment, all had a considerably increased resveratrol content, as compared with the control group. Among the Experimental groups, Experimental group 2, that is, the peanut sprout sample subjected to the UV treatment at a wavelength of 285 nm, had the highest resveratrol content.

Figure 7:
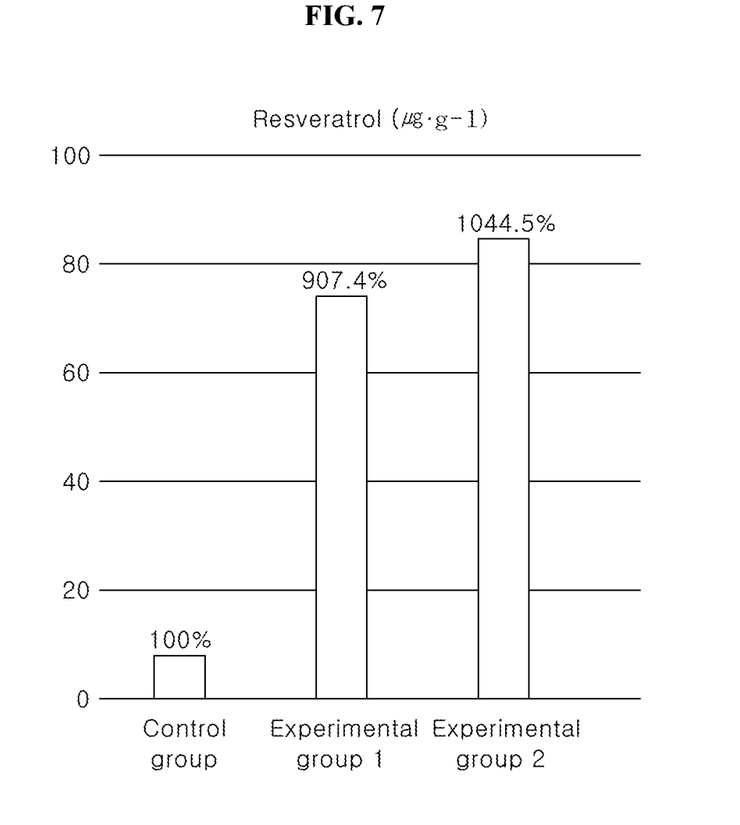
FIG. 7 is a graph showing UV treatment time-dependent changes in phytochemical content.

FIG. 7 is a graph showing a UV treatment time-dependent phytochemical content of peanut sprouts.

Peanut sprouts were subjected to the UV treatment at an irradiance of 10 µW/cm$^2$ after 6 days subsequent to sowing. Here, planting of peanut seeds and cultivation of the peanut sprouts were performed in the same manner as in the above experiment.

Thereafter, the peanut sprouts were harvested, followed by measurement of the content of resveratrol, which is a phytochemical, and then the measured value was compared with that of a control group.

In this experiment, the control group was a peanut sprout sample not subjected to the UV treatment. Experimental group 1 was a peanut sprout sample subjected to the UV treatment at a wavelength of 285 nm for 24 hours. Experimental group 2 was a peanut sprout sample subjected to UV treatment at a wavelength of 285 nm for 48 hours.

Referring to FIG. 7, the resveratrol content of Experimental group 1 was about nine times as high as that of the control group. In addition, the resveratrol content of Experimental group 2 was about ten times as high as that of the control group. That is, it can be seen that the resveratrol content of UV-treated peanut sprouts is significantly higher than that of non-UV-treated peanut sprouts.

Although the resveratrol content of the peanut sprout sample subjected to the UV treatment for 48 hours was higher than that of the peanut sprout sample subjected to the UV treatment for 24 hours, there was no significant difference in the resveratrol content between the two samples.

Figure 8:
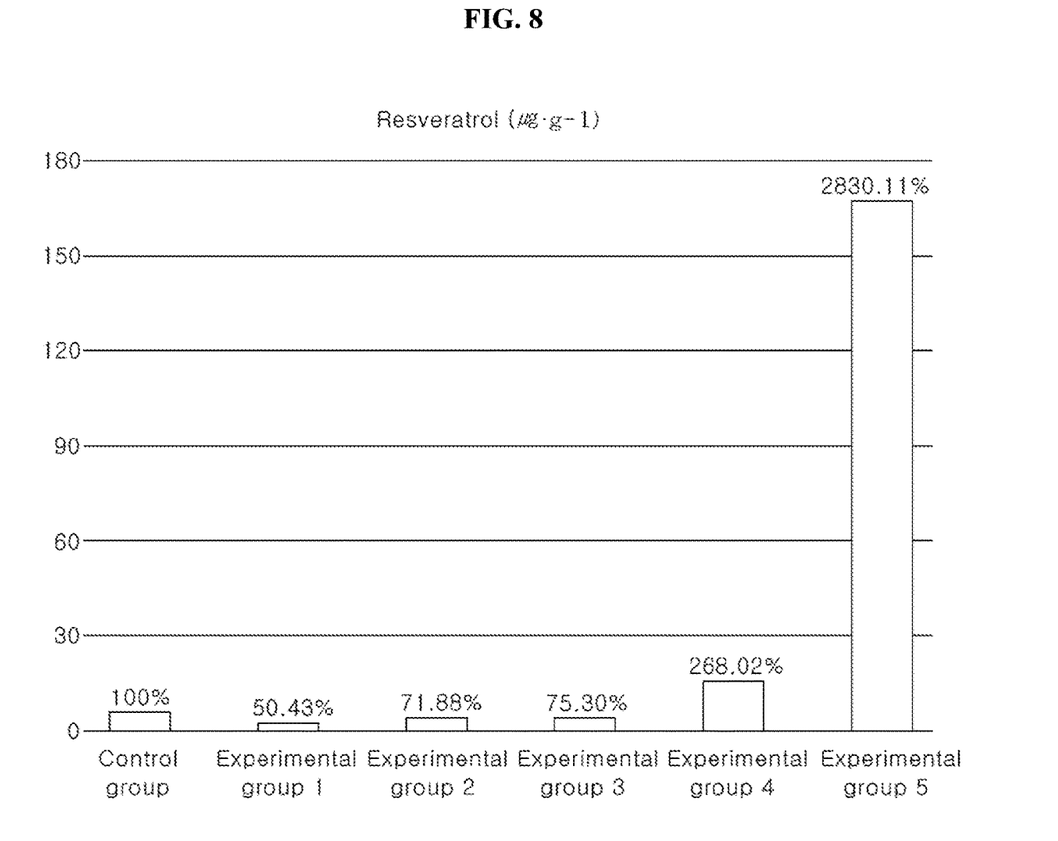
FIG. 8 is another graph showing UV treatment time-dependent changes in phytochemical content.

FIG. 8 is another graph showing a UV treatment time-dependent phytochemical content of peanut sprouts.

Peanut sprouts were subjected to the UV treatment at an irradiance of 10 µW/cm$^2$ after 6 days subsequent to sowing. Here, planting of peanut seeds and cultivation of the peanut sprouts were performed in the same manner as in the above experiments.

Thereafter, the peanut sprouts were harvested, followed by measurement of the content of resveratrol, which is a phytochemical, and then the measured value was compared with that of a control group.

In this experiment, the control group was a peanut sprout sample not subjected to the UV treatment. Experimental group 1 was a peanut sprout sample subjected to the UV treatment at a wavelength of 285 nm for 1 hour. Experimental group 2 was a peanut sprout sample subjected to the UV treatment at a wavelength of 285 nm for 3 hours. Experimental group 3 was a peanut sprout sample subjected to the UV treatment at a wavelength of 285 nm for 6 hours. Experimental group 4 was a peanut sprout sample subjected to the UV treatment at a wavelength of 285 nm for 12 hours. Experimental group 5 was a peanut sprout sample subjected to the UV treatment at a wavelength of 285 nm for 24 hours.

Referring to FIG. 8, Experimental groups 1 to 3 had a slightly lower resveratrol content than the control group. Experimental groups 4 and 5 had a higher resveratrol content than the control group. In particular, Experimental group 5 had a significantly increased resveratrol content, as compared with Experimental group 4.

Referring to FIG. 7 and FIG. 8, it can be seen that a minimum UV treatment time of 24 hours is required to achieve the significant increase in resveratrol content of peanut sprouts through UV treatment. Considering the cultivation period, the effective UV treatment time is 24 hours.

Table 1 shows an average resveratrol content per peanut sprout.

TABLE 1

Resveratrol content of peanut sprouts

| Item | Resveratrol content (µg/g) | |
|---|---|---|
| | Control group | Experimental group 1 |
| Experiment 1 | 5.91 | 167.30 |
| Experiment 2 | 8.16 | 74.04 |
| Experiment 3 | 0.18 | 57.28 |
| Average | 4.75 | 99.54 |

Through three experiments for each of the control group and Experimental group 1, the average resveratrol content of the control group and the average resveratrol content of Experimental group 1 were determined. In Table 1, "resveratrol content" indicates the content of resveratrol per dry-weight gram of peanut sprout.

Referring to Table 1, Experimental group 1 had a higher resveratrol content than the control group.

In general, 100 mg of red wine is known to contain 300 µg of resveratrol.

A dry weight of one peanut sprout is about 0.8 g.

Therefore, approximately 79 non-UV-treated peanut sprouts are needed to take in 300 µg of resveratrol, which corresponds to resveratrol contained in 100 mg of red wine.

On the contrary, approximately four UV-treated peanut sprouts are needed to take in resveratrol in an amount corresponding to 100 mg of red wine. In addition, since the UV-treated peanut sprout contains large amounts of phytochemicals such as resveratrol, the intake of a sufficient amount of phytochemicals is possible even with a small number of UV-treated peanut sprouts.

Further, peanut sprouts are easy to grow and the growing period thereof is shorter than the period required for producing wine.

Figure 9:
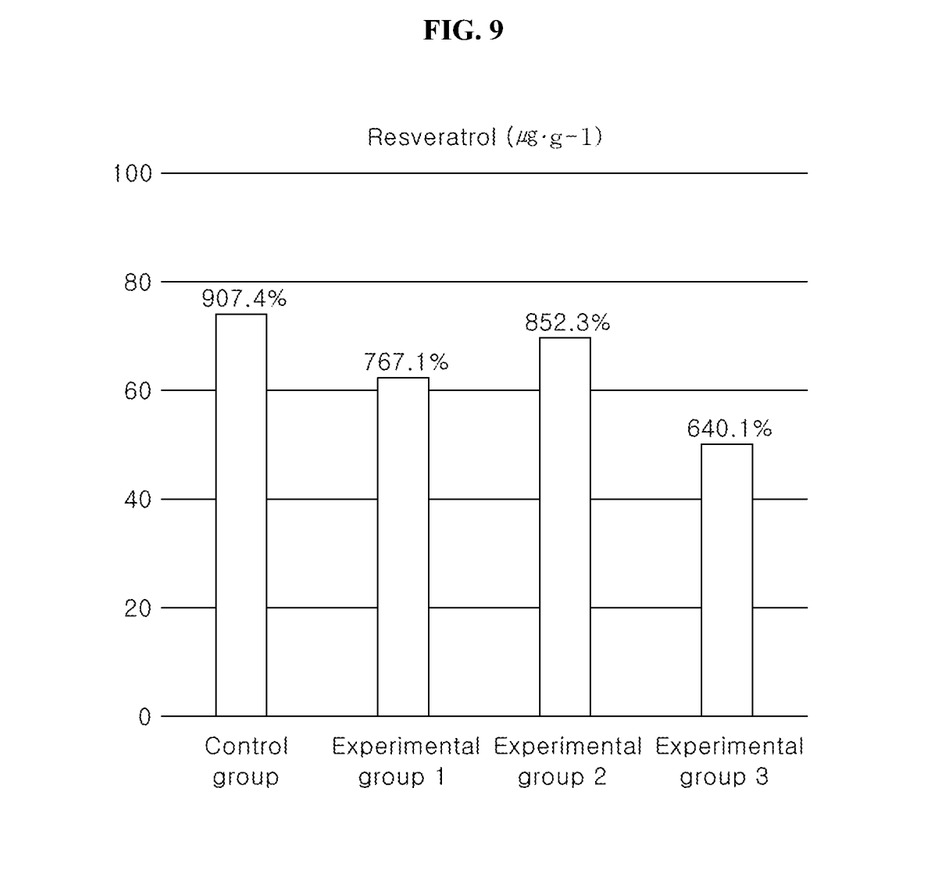
FIG. 9 is a graph showing changes in phytochemical content of peanut sprouts depending on storage time after UV treatment.

FIG. 9 is a graph showing changes in the phytochemical content of peanut sprouts depending on storage time after the UV treatment.

Peanut sprouts were subjected to the UV treatment at an irradiance of 10 μW/cm² for 24 hours after 6 days subsequent to sowing. Here, planting of peanut seeds and cultivation of the peanut sprouts were performed in the same manner as in the above experiments. UV light having a wavelength of 285 nm was used for the UV treatment.

In this experiment, the peanut sprouts were subjected to cold storage at 4° C. after UV treatment.

In this experiment, a control group was a peanut sprout sample substantially immediately after the UV treatment. Experimental group 1 was a peanut sprout sample subjected to cold storage for 1 day after UV treatment. Experimental Group 2 was a peanut sprout sample subjected to cold storage for 2 days after UV treatment. Experimental group 3 is a peanut sprout sample subjected to cold storage for 3 day after UV treatment.

Referring to FIG. 9, Experimental groups 1 to 3, which had been subjected to cold storage, all had a lower resveratrol content than the control group.

Therefore, it can be seen that the content of resveratrol generally decreases in a gradual manner as cold-storage time is prolonged, although Experimental group 2 had a higher resveratrol content than Experimental groups 1 and 3.

Figure 10:
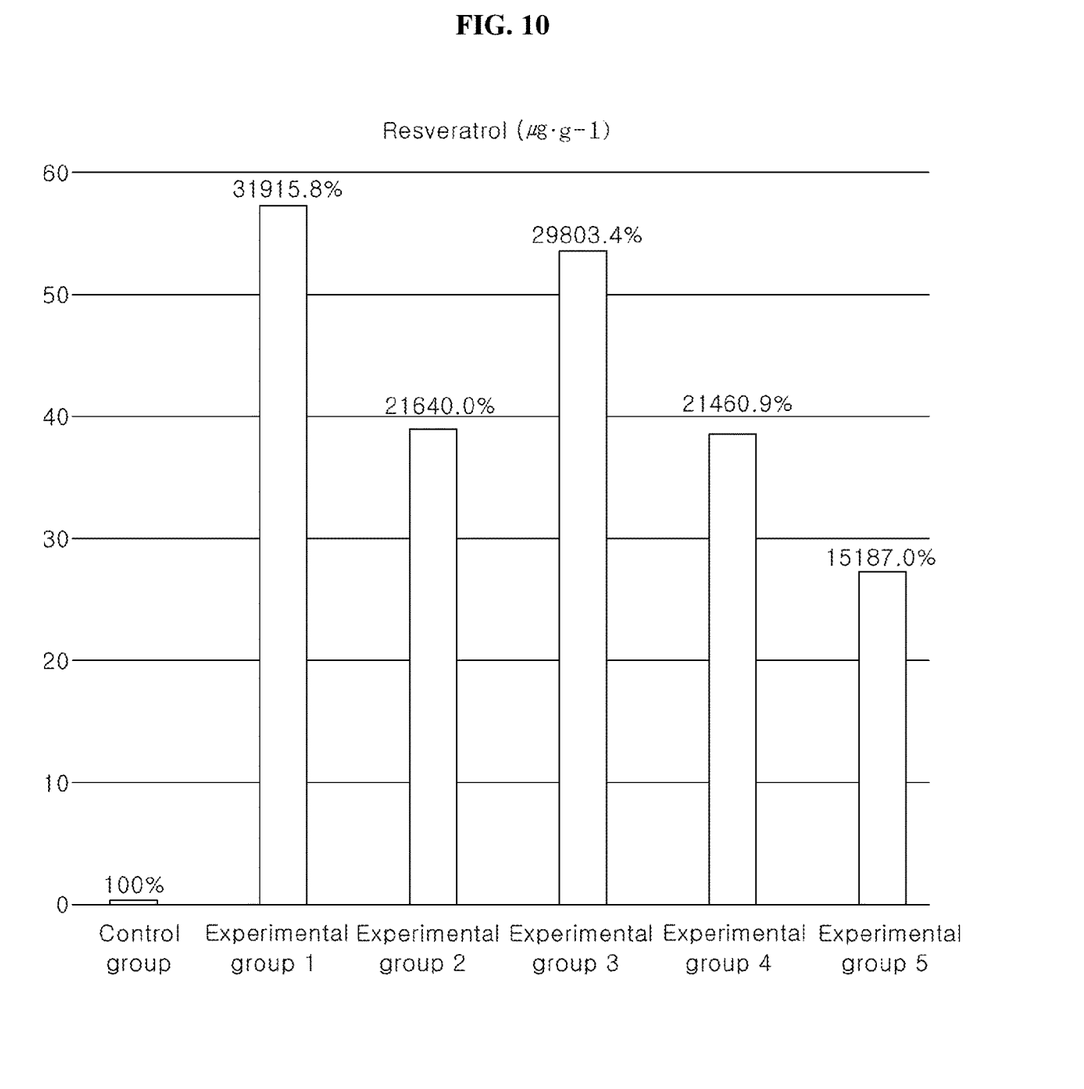
FIG. 10 is another graph showing changes in phytochemical content of peanut sprouts depending on storage time after UV treatment.

FIG. 10 is another graph showing changes in the phytochemical content of peanut sprouts depending on a storage time after the UV treatment.

Peanut sprouts were subjected to the UV treatment at a wavelength of 285 nm for 24 hours after 6 days subsequent to sowing. Here, planting of peanut seeds and cultivation of the peanut sprouts were performed in the same manner as in the above experiments.

In this experiment, after the UV treatment, the peanut sprouts were subjected to cold storage at 4° C. for 6 days, 8 days, 10 days, or 13 days, followed by the measurement of the content of resveratrol in the peanut sprouts.

A control group was a peanut sprout sample not subjected to the UV treatment. Experimental group 1 was a peanut sprout sample immediately after UV treatment. Experimental group 2 was a peanut sprout sample subjected to cold storage for 6 days after the UV treatment. Experimental group 3 was a peanut sprout sample subjected to cold storage for 8 days after the UV treatment. Experimental group 4 is a peanut sprout sample subjected to cold storage for 10 days after the UV treatment. Experimental group 5 was a peanut sprout sample subjected to cold storage for 13 days after the UV treatment.

Referring to FIG. 10, comparison between Experimental groups 1 to 5 shows that the content of resveratrol generally decreases as cold-storage time is prolonged.

However, Experimental groups 1 to 5 all have had a significantly high resveratrol content, as compared with the control group. That is, it can be seen that, even after long-term cold storage, UV-treated peanut sprouts have a higher resveratrol content than non-UV-treated peanut sprouts.

Although some exemplary embodiments have been described herein, it should be understood that these exemplary embodiments are provided for illustration only and are not to be construed in any way as limiting the present disclosure, and that various modifications, changes, alterations, and equivalent exemplary embodiments can be made by those skilled in the art without departing from the spirit and scope of the disclosure. For example, although it has been described that the air outlet is provided to the exhaust cover, additionally or alternatively, the air outlet may be formed through a sidewall of the casing and the like.

We claim:

1. A plant cultivation method for increasing a content of a phytochemical, comprising:
   planting a seed after soaking the seed in water for 0.5 to 6 hours;
   supplying the seed with water at an interval of 20 minutes under dark conditions at 20° C. to 25° C. for seven days;
   growing a plant from a germinated seed;
   applying ultraviolet ("UV") treatment on the plant and increasing a content of a phytochemical through the UV treatment on the plant,
   wherein applying the UV treatment includes irradiating the plant with UV light emitted from a light emitting diode ("LED");
   adjusting an amount of the UV treatment and a duration and a timing of the UV treatment associated with harvesting; and
   harvesting the plant; and
   wherein the phytochemical is resveratrol.

2. The plant cultivation method according to claim 1, wherein, the step of increasing the content of the phytochemical further comprises performing the UV treatment for 24 hours before harvesting the plant.

3. The plant cultivation method according to claim 1, wherein the UV light is at least one selected from the group of UVB and UVC.

4. The plant cultivation method according to claim 3, wherein a wavelength of the UV light is at least one selected from the group of 275 nm, 285 nm and 295 nm.

5. The plant cultivation method according to claim 4, wherein a wavelength of the UV light is 285 nm.

6. The plant cultivation method according to claim 1, wherein adjusting the amount of the UV treatment further comprises:
   adjusting the duration and the timing of the UV treatment associated with harvesting such that the phytochemical content of the plant subjected to the UV treatment is twice or more than a phytochemical content of another plant of the same kind and not subjected to the UV treatment before harvesting.

7. The plant cultivation method according to claim 1, wherein:
   applying the UV treatment on the plant further comprises applying UVB on the plant; and
   adjusting the amount of the UV treatment further comprises adjusting the duration and the timing of the UV treatment associated with harvesting such that the phytochemical content of the plant treated with UVB is twice or more than a phytochemical content of another plant of the same kind and not subjected to the UV treatment before harvesting.

8. The plant cultivation method according to claim 1, wherein:
applying the UV treatment on the plant further comprises applying UVC on the plant; and
adjusting the amount of the UV treatment further comprises adjusting the duration and the timing of the UV treatment associated with harvesting such that the phytochemical content of the plant treated with UVC is four times or more than a phytochemical content of another plant of the same kind and not subjected to the UV treatment before harvesting.

9. The plant cultivation method according to claim 1, wherein the plant comprises a peanut sprout.

10. A plant cultivation method for increasing a content of a phytochemical, comprising:
growing a plant from a germinated seed;
applying ultraviolet ("UV") treatment on the plant and increasing a content of a phytochemical through the UV treatment on the plant,
wherein applying the UV treatment includes irradiating the plant with UV light emitted from a light emitting diode ("LED");
adjusting an amount of the UV treatment and a duration and a timing of the UV treatment associated with harvesting; and
harvesting the plant;
wherein the phytochemical is resveratrol; and
wherein the UV treatment is performed at an irradiance of 10 μW/cm².

11. A light treatment apparatus for increasing a content of a phytochemical, comprising:
a housing configured to block external light;
a cultivation plate including seeds of a selected plant under cultivation sown thereon and growing the seeds of the selected plant under cultivation into sprouts, the cultivation plate upwardly spaced apart from an inner lower surface of the housing; and
wherein water is stored in a space between the cultivation plate and the inner lower surface of the housing;
a light treatment unit arranged in the housing and operable to emit, before harvesting, at least one type of UV light selected from the group of UVB and UVC, the light treatment unit being adapted to increase a content of resveratrol as a phytochemical by irradiating the selected plant under cultivation with the at least one type of UV light selected from the group of UVB and UVC before harvesting; and
wherein the irradiation of the at least one type of UV light is performed at an irradiance of 10 μW/cm².

12. The light treatment apparatus according to claim 11, wherein a wavelength of the UV light is at least one selected from the group of 275 nm, 285 nm and 295 nm.

13. The light treatment apparatus according to claim 12, wherein a wavelength of the UV light is 285 nm.

14. The light treatment apparatus according to claim 11, wherein the light treatment unit is operable to adjust a duration and a timing of the irradiation associated with harvesting such that a phytochemical content of the selected plant subjected to UV treatment using the light treatment unit is twice or more than a phytochemical content of another plant of the same kind and not subjected to UV treatment.

15. The light treatment apparatus according to claim 11, wherein the light treatment unit is operable to adjust a duration and a timing of the irradiation associated with harvesting such that a phytochemical content of the selected plant treated with UVB using the light treatment unit is twice or more than a phytochemical content of another plant of the same kind and not subjected to UV treatment before harvesting.

16. The light treatment apparatus according to claim 11, wherein the light treatment unit is operable to adjust a duration and a timing of the irradiation associated with harvesting such that a phytochemical content of the selected plant treated with UVC using the light treatment unit is four times or more than a phytochemical content of another plant of the same kind and not subjected to the UV treatment before harvesting.

17. The light treatment apparatus according to claim 11, wherein the selected plant is a peanut sprout.

* * * * *